United States Patent
Kong et al.

(10) Patent No.: US 9,293,153 B2
(45) Date of Patent: Mar. 22, 2016

(54) METHOD AND SYSTEM FOR PRESERVING DATA OF A STORAGE DEVICE

(71) Applicant: SEAGATE TECHNOLOGY LLC, Cupertino, CA (US)

(72) Inventors: Sokhyun Kong, Gyeonnggi-Do (KR); Hoosan Lee, Gyeonggi-Do (KR); Mai Ghaly, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/057,152

(22) Filed: Oct. 18, 2013

(65) Prior Publication Data

US 2015/0113201 A1    Apr. 23, 2015

(51) Int. Cl.
*G11B 5/09*  (2006.01)
*G11B 20/10* (2006.01)
*G11B 20/18* (2006.01)
*G11B 20/12* (2006.01)
*G11B 5/012* (2006.01)

(52) U.S. Cl.
CPC ............ *G11B 5/09* (2013.01); *G11B 20/10009* (2013.01); *G11B 20/10212* (2013.01); *G11B 20/1217* (2013.01); *G11B 20/1889* (2013.01); *G06F 2212/1032* (2013.01); *G11B 5/012* (2013.01); *G11B 2220/2516* (2013.01)

(58) Field of Classification Search
None
See application file for complete search history.

(56) References Cited

U.S. PATENT DOCUMENTS

| | | | |
|---|---|---|---|
| 6,850,443 B2 | 2/2005 | Lofgren et al. | |
| 7,345,837 B1 | 3/2008 | Schreck et al. | |
| 7,477,465 B2 | 1/2009 | Yu | |
| 7,567,400 B2 | 7/2009 | Cheng | |
| 7,738,208 B2 | 6/2010 | Kim | |
| 7,747,907 B2 | 6/2010 | Olds | |
| 7,859,784 B2 | 12/2010 | Ogawa | |
| 8,014,097 B1 | 9/2011 | Sanvido | |
| 8,023,215 B1 | 9/2011 | Ghaly et al. | |
| 8,301,830 B2 | 10/2012 | Feldman | |
| 8,312,204 B2 | 11/2012 | Zhang | |
| 8,325,434 B2 | 12/2012 | Namkoong | |
| 8,578,089 B2 | 11/2013 | Watts et al. | |
| 8,736,994 B2 | 5/2014 | Sugawara | |
| 2005/0180267 A1 | 8/2005 | Jeong | |
| 2008/0174905 A1 | 7/2008 | Ueda | |
| 2009/0154000 A1 | 6/2009 | Kojima | |
| 2009/0237842 A1* | 9/2009 | Ehrlich | 360/240 |
| 2010/0271727 A1* | 10/2010 | Namkoong et al. | 360/48 |
| 2011/0161557 A1 | 6/2011 | Haines et al. | |
| 2013/0028061 A1* | 1/2013 | Rosen et al. | 369/13.32 |
| 2013/0117520 A1 | 5/2013 | Ryu | |
| 2014/0075110 A1 | 3/2014 | Benhase et al. | |

OTHER PUBLICATIONS

U.S. Appl. No. 14/508,098, filed Oct. 7, 2014, Ghaly.

* cited by examiner

*Primary Examiner* — Daniell L Negron
(74) *Attorney, Agent, or Firm* — Mueting, Raasch & Gebhardt, P.A.

(57) ABSTRACT

A method and system for preserving data of a storage device are disclosed. In one embodiment, the method includes determining a number of times data is written to a first track in a first region of a storage medium, and rewriting data from a second track that is adjacent to the first track in the first region if the number of times data is written to the first track in the first region exceeds a first predetermined threshold. The method further includes determining a number of times data is rewritten to the second track in the first region, and relocating data from the second track in the first region to a second region of the storage medium if the number of times data is rewritten to the second track in the first region exceeds a second predetermined threshold.

19 Claims, 4 Drawing Sheets

METHOD AND SYSTEM FOR PRESERVING DATA OF A STORAGE DEVICE

SUMMARY

In one aspect, the present disclosure provides a method that includes determining a number of times data is written to a first track in a first region of a storage medium, and rewriting data from a second track that is adjacent to the first track in the first region if the number of times data is written to the first track in the first region exceeds a first predetermined threshold. The method further includes determining a number of times data is rewritten to the second track in the first region, and relocating data from the second track in the first region to a second region of the storage medium if the number of times data is rewritten to the second track in the first region exceeds a second predetermined threshold.

In another aspect, the present disclosure provides a system that includes a storage medium including a first region with a target track and an adjacent track to the target track, and a controller. The controller is configured to rewrite data from the adjacent track if a number of times data is written to the target track exceeds a first threshold amount. The controller is further configured to relocate data from the adjacent track in the first region to a second region of the storage medium if a number of times data is rewritten to the second track exceeds a second threshold amount.

In another aspect, the present disclosure provides a method that includes receiving a write command, and searching a lookup table where a number of writes to a logical block address (LBA) of a first track in a first region of a storage medium is recorded when receiving the write command. The method further includes rewriting data from a second track that is adjacent to the first track in the first region if the number of writes of the LBA of the first track of the first region exceeds a first predetermined threshold of writes, and searching a lookup table where a number of rewrites to an LBA of the second track in the first region is recorded when receiving the write command. The method further includes relocating data from the second track in the first region to a second region of the storage medium if the number of writes of the LBA of the second track in the first region exceeds a second predetermined threshold of writes, and rearranging the LBA of the second track of the first region by interchanging the LBA of the second track of the first region with an LBA of the second region.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

In general, the present disclosure relates to various embodiments of a method and system for preserving data of a data storage device, which, in some embodiments, can minimize data loss due to adjacent track erase (ATE) phenomenon.

The capacity of data storage devices continues to increase. For example, some embodiments of data storage systems utilize magnetic fields to selectively change the magnetic state of magnetic storage media. One technique for increasing the capacity of these types of data storage systems is to increase the number of tracks per inch (TPI) on the magnetic storage media, which represents the track density of a system.

In some embodiments, a writing element portion of a magnetic head is used to produce a magnetic field that can write data to the magnetic media. As is further described herein, the magnetic field from the writing element portion can be incident upon not only a target track but also tracks that are adjacent to the target track. As the TPI or density of the magnetic media increases, the likelihood that adjacent tracks are affected by the magnetic fields from the writing element portion also increases. This overlap of the magnetic field onto adjacent tracks can weaken or even erase the data signal from these tracks, i.e., adjacent track erase (ATE) can occur. In other words, the ATE phenomenon can occur if data is repetitively written in one position (i.e., to a target track) because the magnetic field used to write data to the target track can affect tracks adjacent to the target track, thereby potentially damaging or erasing the data written to the adjacent tracks.

One or more embodiments of the present disclosure can reduce or eliminate the ATE phenomenon by monitoring the number of times data is written to a target or first track, and then rewriting data from one or more tracks that are adjacent to the first track if the number of times data is written to the first track exceeds a first predetermined threshold. Further, in some embodiments, the number of times data is rewritten to these adjacent tracks can be monitored, and this data can be relocated to a different region or location of the magnetic storage medium if the number of times data is rewritten to adjacent tracks exceeds a second predetermined threshold.

Figure 1:
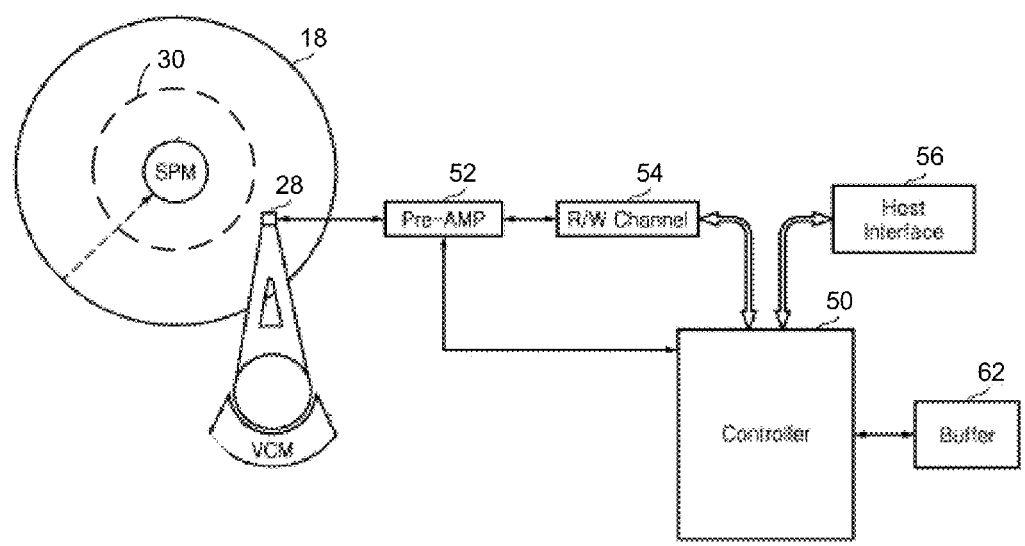
FIG. 1 is a schematic block diagram of one embodiment of a data storage system.

The various embodiments of a method and system of the present disclosure can be used with any suitable data storage systems. For example, FIG. 1 is a schematic plan view of one embodiment of a data storage system 10. The system 10 includes data storage medium 18. Medium 18 can be divided into data tracks, such as track 30, and a head 28 is positioned adjacent the data tracks to read data from and store data to a respective track.

The tracks 30 can be provided with head position control information written to embedded servo sectors. Between the embedded servo sectors are data sectors used for storing data in the form of bit patterns. The head 28 can include a read element portion and a write element portion. The write element portion writes input data to the track 30 during write operations of the device 10, and the read element portion reads output data from the tracks. This output data can be previously stored data that is being recalled for use in processing, or the data can be servo data used to control the positioning of the head 28 relative to a desired track 30. In some embodiments, medium 18 can be dedicated to providing servo information for one or more other heads 28.

The system 10 can include any suitable control circuitry. For example, system 10 includes a driving circuit that includes a controller 50 that controls a pre-amplifier (Pre-AMP) 52, a read/write channel (R/W channel) 54, a host interface 56, a buffer 62, etc.

The pre-amplifier 52 amplifies a data signal read from the medium 18 by the magnetic head 28, or amplifies a writing electric current converted by the read/write channel 54 to be written on the medium through the magnetic head.

The read/write channel 54 converts the signal amplified by the pre-amplifier 52 into a digital signal to be transmitted to a host device (not shown) through the host interface 56, or converts data input by a user and received through the host interface into a binary data stream to be input to the pre-amplifier.

The host interface 56 transmits a digital signal converted based on data to the host device, or receives user input data from the host device and transmits it to the read/write channel 54 via the controller 50. Here, the host device refers to elements such as a central processing unit (CPU), an input/output (I/O) controller 50, or the like of a computer that generally controls and operates the whole computer system involving the system 10.

The buffer 62 temporarily stores data transmitted between the host interface 56 and the controller 50. Generally, the buffer 62 can include any suitable memory storage, e.g., dynamic random access memory (DRAM) or nonvolatile memory, like flash memory.

The controller 50 receives data input by a user through the host device through the host interface 56 and outputs it to the read/write channel 54 in a data writing mode, and receives a digital signal converted based on a read signal by the read/write channel and outputs it to the host interface 58 in a data reading mode. In some embodiments, controller 50 preserves data by rewriting and/or relocating the data that is written in a zone or region where the ATE phenomenon is likely to occur as is further described herein.

The controller 50 can include any suitable devices or circuitry, e.g., microcontrollers, etc. In some embodiments, the controller 50 can be in the form of software or firmware.

Figure 2:
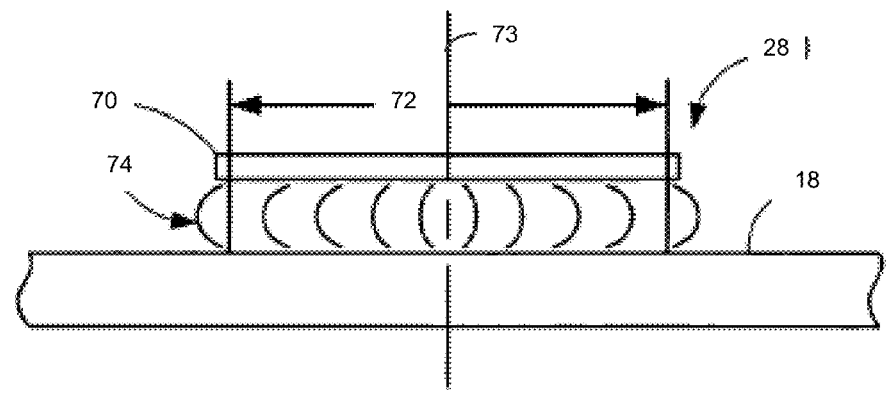
FIG. 2 is a schematic cross-section view of one embodiment of a write element portion of the head and the magnetic medium of the system of FIG. 1.
Figure 3:
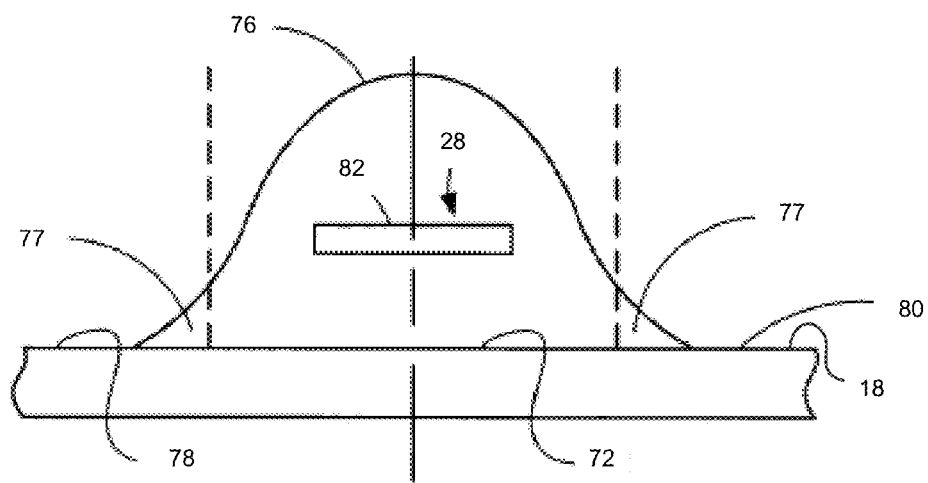
FIG. 3 is a schematic cross-section view of one embodiment of a read element portion of the head and the magnetic medium of the system of FIG. 1.

As mentioned herein, the ATE phenomenon can occur when a writing operation is repeatedly performed on a target track. Because the magnetic write field can overlap tracks adjacent to the target track during these write operations, the data in these adjacent tracks can be unintentionally weakened or erased. For example, FIG. 2 is a schematic cross-section view of one embodiment of a write element portion 70 of the head 28 in a data storing relationship with the medium 18 of the system 10 illustrated in FIG. 1. And FIG. 3 is a schematic cross-section view of a read element portion 82 of the head 28 in a data reading relationship with the magnetic medium 18. The head 28 is positioned relative to a centerline 73 of track 72. The write element portion 70 is selectively energized to produce a magnetic flux field 74 that stores input data, such as by imparting magnetic transitions in the medium 18. Typically, the fringe effects of the flux field 74 are wider than the width of the track 72 as illustrated by a flux density profile 76 illustrated in FIG. 3. It has been observed that under certain conditions an advantageously robust flux field 74 can be imparted to a particular location of track 72 with negligible effects of tail portions 77 of the flux density profile 76 that are imparted to adjacent tracks 78 and 80. In some embodiments, the fringe effects have been negligible in part because of the flux strength with which data in the adjacent tracks 78, 80 are stored, in part because of the relatively minimal extent to which the tail portions 77 encroach upon the adjacent tracks, and in part because a read element portion 82 of the head 28 is typically narrower than the write element portion 70. Because of the latter, with sufficient tracking precision of the head 28 the read element portion 82 is capable of reading a centrally disposed portion of the entirety of the stored data.

However, as track density increases, the width of track 72 decreases, thereby potentially making it more challenging for the read element portion 82 to only read track 72. Further, repeated writes to the same portion of the medium 18, such as to a particular sector, or to a particular track or a band of tracks, can affect the integrity of the data that is stored in adjacent tracks 78, 80. As used herein, the term "writes" refers to the writing of data to a particular track or region of a magnetic storage medium. Further, these kinds of repeated writings are typical of activities commonly associated with the continual updating of stored information. These adverse effects can be exacerbated by off-track budgeting that permits the storing and retrieving of data with the head 28 being disposed in a somewhat nonaligned relationship with the centerline 73 of track 72.

The ability of the storage medium to reliably "hold" a stored direction of magnetization is related to a material property of the grains of magnetic material known as anisotropy energy. As areal density has increased, the grain size has correspondingly decreased to maintain the requisite number of grains for adequate thermal stability. However, the anisotropy energy of each grain is proportional to its size, so the relatively smaller grains are more susceptible to thermal decay (superparamagnetic effect). It has been observed that the flux fringe effects from a large number of repeated writes to a particular track produces adverse cumulative effects on the adjacent tracks.

Figure 4:
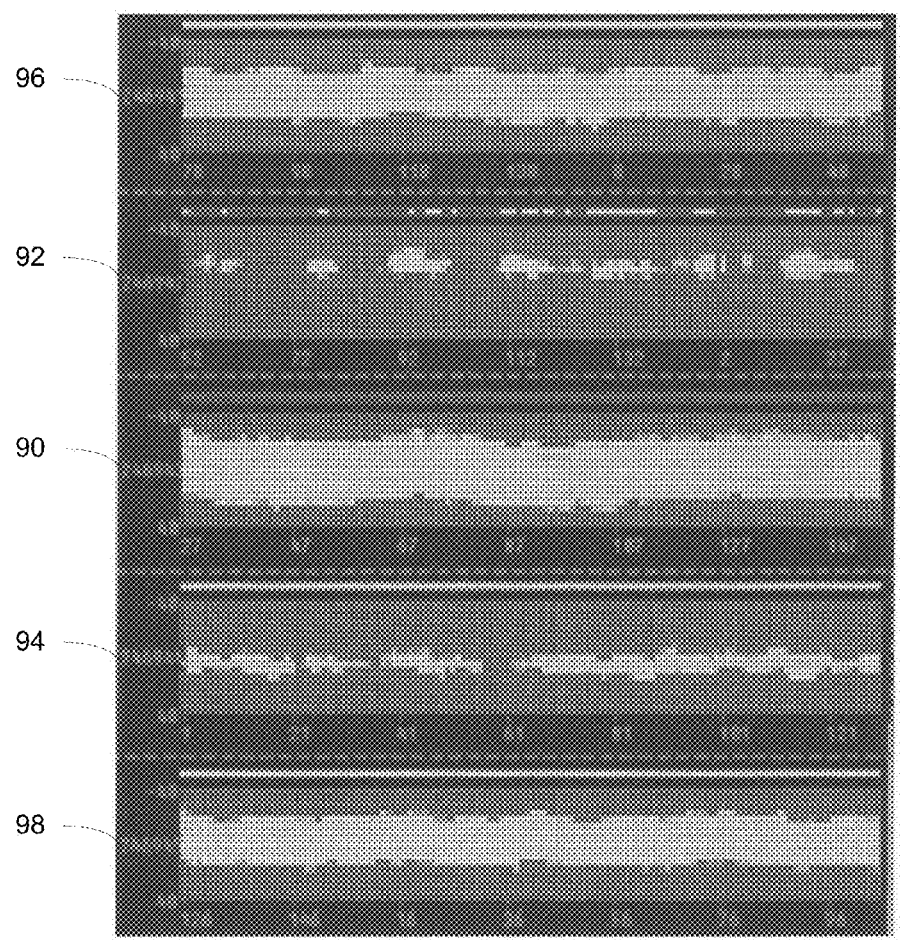
FIG. 4 is a schematic view of signal states for various tracks of a magnetic medium.

FIG. 4 is a schematic view of signal states of a first or target track 90 and adjacent tracks 92, 94 (e.g., second and third tracks). Also shown are additional target tracks 96, 98. The first track 90 has been written to more than 10,000 times. As shown in FIG. 4, the data signals from the adjacent tracks 92, 94 are weakened by side fields of the writing element portion as the magnetic head writes to first track 90. That is, when a multi-writing operation is performed on the first track 90 more than a certain number of times (e.g., more than 10,000 times as shown in FIG. 4), the signal states of the adjacent tracks 92, 94 can experience signal degradation.

Figure 5:
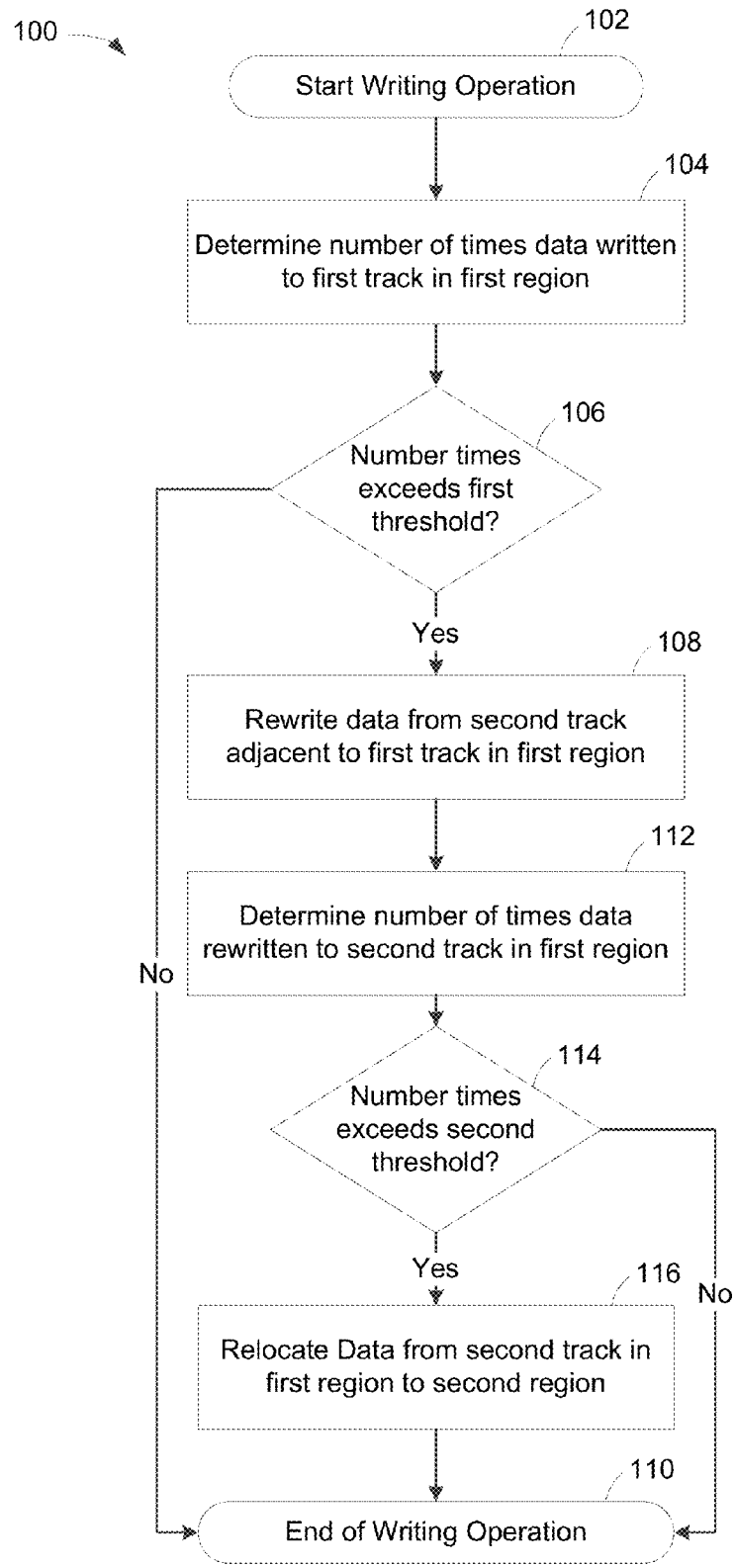
FIG. 5 is a flow diagram of one embodiment of a method of preserving data.

The present disclosure provides various embodiments of a method and system that can address this signal degradation of tracks that are adjacent to target tracks, thereby reducing the ATE phenomenon. For example, FIG. 5 is a flow diagram of one embodiment of a method 100 for preserving data. The method 100 is described in reference to the storage system 10 of FIG. 1. The method can be implemented using any suitable devices or circuitry, e.g., controller 50 of FIG. 1.

A write command is given to commence a write operation at 102. A number of times data is written to a first track in a first region of a storage medium (e.g., storage medium 18) is determined at 104 using any suitable technique. For example, in some embodiments, controller 50 can search a lookup table where the number of writes to a logical block address (LBA) of the first track in the first region is recorded when receiving the write command.

Here, the LBA means a series of sector and/or track numbers allocated to the respective sectors and tracks of the magnetic medium, e.g., medium 18 of FIG. 1 (e.g., sequentially allocated by giving "0" to the first sector) in logical block addressing as one technique for assigning the sector address of the disk, in which one LBA assigns one sector on the disk.

In some embodiments, when a writing command is input to controller 50 and a writing operation starts, the lookup table where the number of writes performed to a specific LBA is recorded and can be searched at 104.

The lookup table can be stored, e.g., in a maintenance cylinder of the magnetic medium 18 and uploaded to a buffer (e.g., buffer 62 of FIG. 1) when the device 10 is powered on. That is, in some embodiments, the lookup table can be uploaded from the media 18 to the buffer and then searched.

In some embodiments, if the lookup table has no LBA for assigning the first track in the first region for the writing in response to the writing command as a result of searching the lookup table, an LBA for assigning the first track can be added to the lookup table. At this time, the number of writes for the newly added LBA is initialized with "1." Alternatively, in some embodiments, all LBAs may be previously stored in the lookup table.

At 106, if the number of times data has been written to the first track in the first region exceeds a first predetermined threshold (i.e., a first threshold amount), then data from a second track adjacent to the first track in the first region (i.e., an adjacent track) is rewritten at 108. This first predetermined threshold can be any suitable number of writes. In some embodiments, the first threshold can be at least 10 times, at least 100 times, at least 1000 times, at least 10,000 times. In other embodiments, the first threshold can be no more than 100,000 times. In some embodiments, the threshold can be determined by estimating the number of writes to the first track that may cause data in adjacent tracks to be degraded or lost because of the ATE phenomenon. Further, this first threshold can vary depending upon one or more factors, e.g., environmental conditions that the device 10 is subjected to, the composition of the magnetic storage medium 18, the strength of the write field, etc.

If the number of times data is written to the first track in the first region does not exceed the first predetermined threshold, then, in some embodiments, the number of writes for this track is increased by one in the lookup table.

If the lookup table is being read from the buffer 62, then the lookup table stored in the maintenance cylinder can be updated with the lookup table uploaded to the buffer when the storage device 10 enters an idle time mode or is powered off, for example.

Further, if this first predetermined threshold is not exceeded, then the write operation ends at 110.

If, on the other hand, the number of times data is written to the first track in the first region exceeds the first predetermined threshold and data is rewritten to the second track in the first region of the medium 18, then at 112 the number of times this data has been rewritten to the second track in the first region is determined. Any suitable techniques may be utilized to make this determination. For example, in some embodiments, this determination can be performed by searching a lookup table where the number of rewrites to an LBA of the second track of the first region is recorded when the write command is received.

If the number of times data is rewritten to the second track in the first region exceeds a second predetermined threshold (i.e., a second threshold amount), then this data is relocated to a second region at 116. The second region can be any suitable region of the media 18. In some embodiments, the second region can be a region that has not been previously allocated for data storage. In other embodiments, the second region can be a previously allocated region.

In some embodiments, the second region can be a part of an A-list where data from defective sectors of the media 18 are stored. In other embodiments, the second region can be a part of a temporary list.

In some embodiments, after the data from the second track in the first region is relocated to the second region, the LBA of the second track of the first region can be rearranged with an LBA of the second region by interchanging the LBA of the second track in the first region with an LBA of the second region.

The second predetermined threshold for the number of times data is rewritten to the second track in the first region can be any suitable number of writes. In some embodiments, this second threshold is at least 5 times, at least 10 times, at least 15 times, at least 20 times. In some embodiments, this threshold is no greater than 1000, 100, etc. Once again, this second threshold can, in some embodiments, be determined by estimating the number of times data can be rewritten to the second track in the first region before the integrity of this data is compromised. Such estimation can be affected by several factors, including environmental conditions that the device 10 is subjected to, the composition of the medium 18, and the strength of the magnetic write field, etc.

In some embodiments, after the data from the second track in the first region has been relocated, additional data can be prevented from being written to the second track in the first region. Any suitable technique can be utilized to block this region from subsequent write operations. For example, the LBA for the second track in the first region can be removed from the lookup table.

In some embodiments, if the second region of the media 18 becomes fully occupied with data, then the data that was relocated to the second region from the second track of the first region can be relocated back to the first region. Any suitable technique can be utilized to relocate this data. Further, in some embodiments, data from the second region can be relocated to the second track of the first region when the data from the second track in the first region is relocated to the second region.

If the number of times data is rewritten to the second track in the first region does not exceed the second predetermined threshold, then the writing operation ends at 110. In some embodiments, prior to, during, or after ending the write operation at 110, the number of times data has been rewritten to the second track in the first region is increased by one in the lookup table.

Although the method 100 includes a second track that is adjacent to a first track or target track, any suitable number of tracks adjacent to the first track can be rewritten and/or relocated according to the techniques described herein. For example, in some embodiments, a third track adjacent to the first track in the first region (i.e., a second adjacent track) can be positioned such that the first track is between the second track and the third track. Data from this third track can be rewritten if the number of times data is written to the first track in the first region exceeds a third predetermined threshold (i.e., a third threshold amount). The third predetermined threshold can be the same as or different from the first predetermined threshold for rewriting data to the second track in the first region.

Further, the data from the third track can be relocated to any suitable region of the medium 18 if a number of times data is rewritten to the third track in the first region exceeds a fourth predetermined threshold (i.e., a fourth threshold amount). This fourth threshold can be the same as or different from the second predetermined threshold for relocating data from the second track in the first region to the second region. In some embodiments, data from the third track in the first region can be relocated to the second region where data from the second track in the first region was relocated. In other embodiments, data from the third track in the first region can be relocated to a third region that is different from the second region.

The techniques described herein can be utilized with any suitable storage device or system. For example, in reference to FIG. 1, such system can include a storage medium 18 that includes a first region that has a first or target track and an adjacent track to the first track (i.e., a second track). The apparatus can also include a controller 50. The controller 50 can be configured to rewrite data from the adjacent track if a number of times data is written to the target track exceeds a first threshold amount (i.e., a first predetermined threshold). Further, in some embodiments, the controller 50 can be configured to relocate data from the adjacent track in the first region to a second region of the storage medium if a number of times data is rewritten to the second track exceeds a second threshold amount (i.e., a second predetermined threshold).

In some embodiments, the controller 50 can also be configured to increase the number of times data is written to the target track in the first region by one when the number of times data is written to the target track in the first region does not exceed the first threshold amount. Further, in some embodiments, the controller 50 can also be configured to increase the number of times data is rewritten to the adjacent track in the first region by one when the number of times data is rewritten to the adjacent track does not exceed the second threshold amount.

In some embodiments, the controller 50 can also be configured to rewrite data from a second adjacent track to the first track (i.e., a third track) in the first region if the number of times data is written to the target track exceeds a third threshold amount (i.e., a third predetermined threshold). Further, in some embodiments, the controller 50 can be configured to relocate data from the second adjacent track in the first region to the second region of the storage medium if a number of times data is rewritten to the second track exceeds a fourth threshold amount (i.e., a fourth predetermined threshold).

In some embodiments, the controller 50 can also be configured to prevent additional data from being written to the adjacent track in the first region after data from the adjacent track in the first region is relocated to the second region of the storage medium. Further, in some embodiments, the controller 50 can also be configured to reassign an address of the data that is relocated from the adjacent track in the first region to the second region.

Further, in some embodiments, the controller 50 can also be configured to set the adjacent track in the first region as available memory for storing other data.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

In the preceding description, reference is made to the accompanying set of drawings that form a part hereof and in which are shown by way of illustration several specific embodiments. It is to be understood that other embodiments are contemplated and may be made without departing from the scope or spirit of the present disclosure. The preceding detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

What is claimed is:

1. A method comprising:
   determining a number of times data is written to a first track in a first region of a storage medium;
   rewriting data from a second track that is adjacent to the first track in the first region if the number of times data is written to the first track in the first region exceeds a first predetermined threshold;
   determining a number of times data is rewritten to the second track in the first region; and
   relocating data from the second track in the first region to a second region of the storage medium if the number of times data is rewritten to the second track in the first region exceeds a second predetermined threshold.

2. The method of claim 1, further comprising rewriting data from a third track that is adjacent to the first track in the first region if the number of times data is written to the first track in the first region exceeds a third predetermined threshold, and the first track is positioned between the second track and the third track.

3. The method of claim 2, further comprising relocating data from the third track in the first region to the second region of the storage medium if a number of times data is rewritten to the third track in the first region exceeds a fourth predetermined threshold.

4. The method of claim 1, wherein the first predetermined threshold is at least 100 times.

5. The method of claim 1, wherein the second predetermined threshold is at least 5 times.

6. The method of claim 1, further comprising preventing additional data from being written to the second track in the first region after relocating data from the second track in the first region to the second region of the storage medium.

7. The method of claim 1, further comprising reassigning an address of the data that is relocated from the second track in the first region to the second region.

8. The method of claim 1, further comprising relocating data that was relocated from the second track in the first region to the second region back to the first region if the second region becomes fully occupied.

9. A system comprising:
a storage medium comprising a first region with a target track and an adjacent track to the target track; and
a controller configured to:
rewrite data from the adjacent track if a number of times data is written to the target track exceeds a first threshold amount; and
relocate data from the adjacent track in the first region to a second region of the storage medium if a number of times data is rewritten to the second track exceeds a second threshold amount.

10. The apparatus of claim 9, wherein the controller increases the number of times data is written to the target track in the first region by one when the number of times data is written to the target track in the first region does not exceed the first threshold amount.

11. The apparatus of claim 9, wherein the controller increases the number of times data is rewritten to the adjacent track in the first region by one when the number of times data is rewritten to the adjacent track does not exceed the second threshold amount.

12. The apparatus of claim 9, wherein the controller is further configured to rewrite data from a second adjacent track to the target track in the first region if the number of times data is written to the target track exceeds a third threshold amount.

13. The apparatus of claim 9, wherein the first threshold amount is at least 100 times.

14. The apparatus of claim 9, wherein the second threshold amount is at least 5 times.

15. The apparatus of claim 9, wherein the controller is further configured to prevent additional data from being written to the adjacent track in the first region after data from the adjacent track in the first region is relocated to the second region of the storage medium.

16. The apparatus of claim 9, wherein the controller is further configured to reassign an address of the data that is relocated from the adjacent track in the first region to the second region.

17. The apparatus of claim 9, wherein the controller is further configured to set the adjacent track in the first region as available memory for storing other data.

18. A method comprising:
receiving a write command;
searching a lookup table where a number of writes to a logical block address (LBA) of a first track in a first region of a storage medium is recorded when receiving the write command;
rewriting data from a second track that is adjacent to the first track in the first region if the number of writes of the LBA of the first track of the first region exceeds a first predetermined threshold of writes;
searching a lookup table where a number of rewrites to an LBA of the second track in the first region is recorded when receiving the write command;
relocating data from the second track in the first region to a second region of the storage medium if the number of rewrites of the LBA of the second track in the first region exceeds a second predetermined threshold of rewrites; and
rearranging the LBA of the second track of the first region by interchanging the LBA of the second track in the first region with an LBA of the second region.

19. The method of claim 18, wherein the lookup table is stored in a maintenance cylinder of the magnetic storage medium and uploaded from the maintenance cylinder to a buffer.

* * * * *